United States Patent
Chan et al.

[11] Patent Number: 6,073,147
[45] Date of Patent: Jun. 6, 2000

[54] SYSTEM FOR DISTRIBUTING FONT RESOURCES OVER A COMPUTER NETWORK

[75] Inventors: Allen M. Chan, Cupertino; Robert Lee, San Jose, both of Calif.

[73] Assignee: Apple Computer, Inc., Cupertino, Calif.

[21] Appl. No.: 08/872,149

[22] Filed: Jun. 10, 1997

[51] Int. Cl.[7] .......................... G06T 11/00; G06K 15/00
[52] U.S. Cl. .......................................... 707/542; 345/467
[58] Field of Search ..................................... 707/542, 526, 707/3, 500, 1, 4; 709/201, 200, 203, 217, 219; 364/130; 345/467, 468, 116

[56] References Cited

U.S. PATENT DOCUMENTS 5,432,899  7/1995  Iwatani et al. ........................... 395/145
5,533,174  7/1996  Flowers, Jr. et al. .................... 395/114
5,737,599  4/1998  Rowe et al. .............................. 395/615

*Primary Examiner*—Joseph H. Feild
*Assistant Examiner*—Alford W. Kindred
*Attorney, Agent, or Firm*—Burns, Doane, Swecker & Mathis, L.L.P.

[57] ABSTRACT

A network system includes a font resource server that is accessible to all devices that communicate via the network. The font server contains the necessary information pertaining to the various types of fonts that may be required by users. This information describes the characters in a font in both a bitmap form and an outline form, so that either type of font information can be selectively employed at any given site. When a document is transmitted from the site of its creation to a remote site, the computer at the remote site first determines whether information pertaining to all of the fonts contained in the document is stored at the remote site. If not, the necessary font resources are downloaded from the font server to the remote site, via any suitable communication network. Once the resources have been downloaded, the document can be viewed and printed at the remote site.

8 Claims, 3 Drawing Sheets

SYSTEM FOR DISTRIBUTING FONT RESOURCES OVER A COMPUTER NETWORK

FIELD OF THE INVENTION

The present invention is directed to networked computer systems, and more particularly to a system for sharing font resources via a computer network.

BACKGROUND OF THE INVENTION

One significant outgrowth that has resulted from the prolific use of personal computers to generate documents, coupled with the increasing resolution of printers, is the wide variety of fonts that are available to the average user. In the past, a relatively small number of fonts were typically employed by most users. The most common fonts were usually stored on the users' computers, for example in connection with word processing programs, and likewise stored in the memories of printers. As a result, if a document was created with the commonly employed fonts and subsequently transmitted to another user's computer, there was a high likelihood that the document could be viewed and printed at the remote user's site, since the necessary information relating to the generation of the font's characters and symbols would be available at that site.

More recently, a large number of different types of fonts have become readily available, to provide users with the ability to create different appearances for documents, and thereby present information in a highly attractive manner. To this end, various specialized fonts enable users to employ characters in new and different ways. For example, the "pi" font set (a collection of symbol characters) contains a number of unique symbols that can be used to emphasize messages and create particularly attractive documents. One problem associated with the use of numerous varied fonts is the fact that data which describes the characters of a given font may not be stored on all computers and/or printers. If a document containing characters from such a font is transmitted to a computer which does not contain the data for the font, the user at that computer is not able to view or print the document with all of the information that was intended by the document's author.

To alleviate this situation, certain types of document formats include font information with the contents of the document itself. One example of such a format is the PDF file format, in which the resources for every font that is employed in a document are stored as part of the document file. This approach is particularly advantageous in the case of documents which use special character fonts, such as the pi font. However, the incorporation of font resource information into the document file significantly increases the overall size of the file. This drawback is particularly exacerbated if the document employs fonts with large character sets, such as those associated with the Japanese and Chinese languages. For example, a non-compressed character set for Kanji characters may contain 3–8 MB of data.

It can be appreciated that the transmission of documents whose files incorporate font resources can require a significant amount of time. Likewise, a significant amount of memory can be required to store such files. If multiple fonts are employed in a document, the size of the document file, and hence the transmission time and memory requirements, increase in a commensurate manner. Accordingly, it is desirable to provide a system in which font resources can be made available to users so that documents can be viewed and printed in their original form at any site, but which eliminates the need to transmit the font resource along with the contents of the document.

SUMMARY OF THE INVENTION

In accordance with these objectives, the present invention provides a network system which includes a font resource server that is accessible to all devices that communicate via the network. The font server contains the necessary information pertaining to the various types of fonts that may be required by users. Preferably, this information describes the characters of a font in multiple formats, such as a bitmap form and an outline form, so that different types of font information can be selectively employed at any given site.

When a document is transmitted, for example from the site of its creation to a remote site, the computer at the remote site first determines whether information pertaining to all of the fonts contained in the document is stored at the remote site. If not, the necessary font resources are downloaded from the font server to the remote site, via any suitable communication network. Once the resources have been downloaded, the document can be viewed and printed at the remote site.

In the event that the font server does not contain the requested font resource, e.g. a document contains a relatively new font that has not yet been loaded on the server, an error condition is returned to the requesting site. In response thereto, the computer executes a default action, such as substitute a different font for the unavailable one, or leave blank spaces for the characters of the unavailable font. Thus, the unavailability of the font data is transparent to the user, i.e. no user action is required to compensate for the situation.

In accordance with the invention, therefore, documents containing any of a large variety of fonts can be freely transmitted to different users, and reliably viewed and printed at the users' sites without the need to incorporate font information into the documents, and thereby reduce transmission time and memory requirements.

Further features of the invention, and the advantages attained thereby, are described in detail hereinafter with reference to specific embodiments illustrated in the accompanying drawings.

BRIEF DESCRIPTION OF THE DRAWINGS

FIGS. 4A–4C are illustrations of different embodiments of a key pair.

DETAILED DESCRIPTION

To facilitate an understanding of the present invention, it is described hereinafter with reference to one particular embodiment thereof. It will be appreciated, however, that the practical applications of the invention are not limited to this specific embodiment. Rather, the invention will find utility in a variety of different environments in which it is desirable to provide resources for creating, editing and/or viewing documents, without the need to transmit those resources together with the documents.

Figure 1:
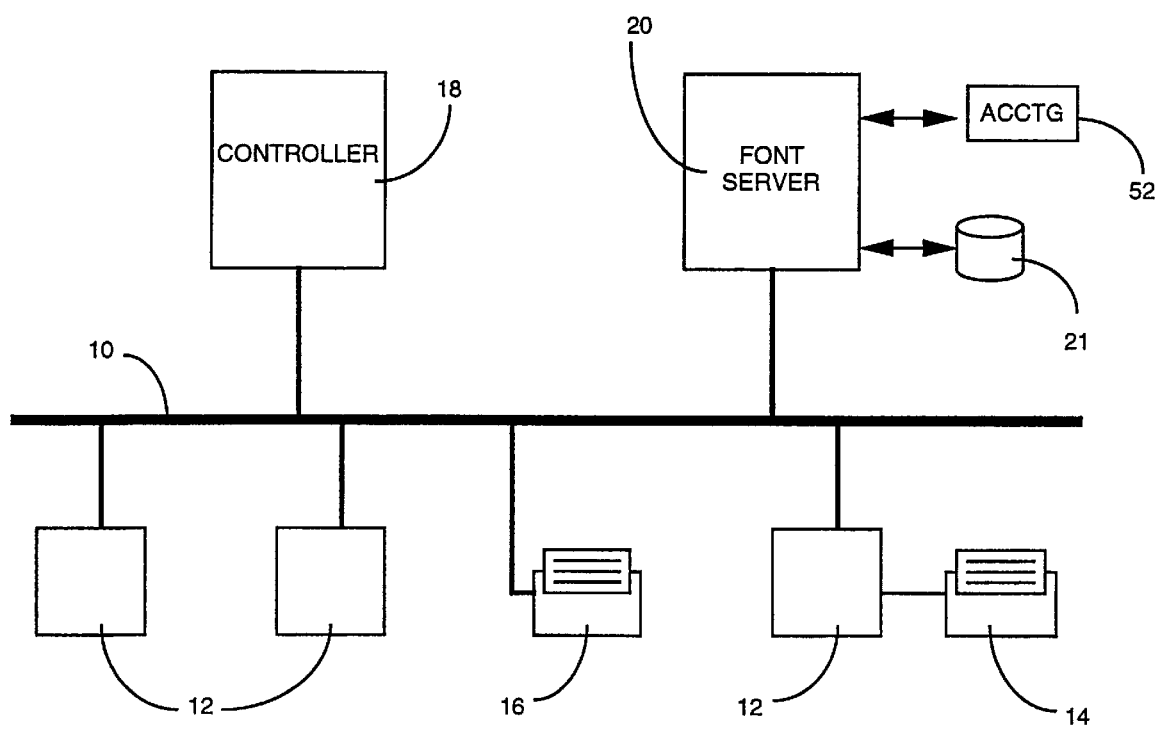
FIG. 1 is a general block diagram of a computer network in which the invention can be implemented.

Referring to the drawings, FIG. 1 is a block diagram of one type of computer network in which the present invention can be implemented. Typically, the network might contain a number of nodes that communicate with one another over a suitable communication path 10, such as telephone lines, an Ethernet layer, or the like. Some of the nodes may be comprised of individual computers 12, such as personal computers, at which users can generate and view documents. One or more of the computers may have a locally connected printer 14, to provide a hard copy of a document that is being created and/or viewed at that node. In addition, a network printer 16 may be directly connected to the communication path 10. Typically, the network printer 16 may be a higher speed printer than the local printers 14 at the nodes, or it may offer additional printing capabilities, e.g. a color laser printer. Documents stored at any of the computers 12 on the network can be sent to the network printer 16 to provide a hard copy output. The network may also include one or more controllers 18, such as a file server for controlling access to file and disk resources on the network, or a router for controlling the flow of data between nodes on the network.

In operation, individual users can create documents at the various computers 12, and thereafter transmit those documents to other nodes on the network, for viewing, editing and/or printing at remote sites. In addition, a document created at any of the computers can be sent to the network printer 16. Although a relatively simple network is illustrated in the example of FIG. 1, in practice the principles of the invention can be employed on a much larger network, such as a wide-area network (WAN), enterprise network or an international network, e.g. the internet.

In the creation of a document, the author might use any of a variety of available fonts for the characters in the document. Some fonts are commonly employed, and therefore might be stored at every computer and printer on the network. In this context, the "storage" of a font means that information which describes each character in the font is stored at the node. The description of the characters can be in any one or more well-known format. Two commonly employed formats are bit-mapped and outline. In the bitmap form, the value of each pixel in a block of pixels is specified, to define a rasterized image which constitutes a given character. In contrast, in the outline form, the shape of the character is defined by certain points on its periphery, e.g. the ends of straight lines. The outline format offers the advantages that it requires less memory to store, and can be easily rescaled to generate any size character.

To reproduce a given character at any of the nodes, the information defining that character must be stored at the node, in at least one of the recognized formats. If the information is not stored at the node, the character cannot be displayed. In such a case, the computer may display a blank at the position of the character, or may substitute a default symbol, e.g. a filled rectangle, in its place.

In accordance with the present invention, the absence of font data at a given node is alleviated by means of a font resource server 20 that is accessible to the nodes on the network. In essence, the font server 20 contains a database 21 of the data necessary to generate most, if not all, fonts that might be contained in a document. Preferably, the font data is stored in each recognized format for the characters of every available font.

In operation, when a document is to be printed and/or displayed at a node on the network, the document is first examined to identify the font associated with each glyph, i.e. text character or symbol, in the document. If the data for each identified font is locally stored at the node, the document can be immediately displayed and printed. If, however, the information resources needed to generate one or more of the identified fonts is not locally available, a request is transmitted from the node to the font server 20 to download the necessary data. The font server 20 determines whether it has available the data for the requested font. If so, that data is retrieved and transmitted to the requesting node, so that the document can be printed and/or displayed in its entirety. This operation is explained in greater detail with reference to the block diagram of FIG. 2 and the flowchart of FIG. 3.

Figure 2:
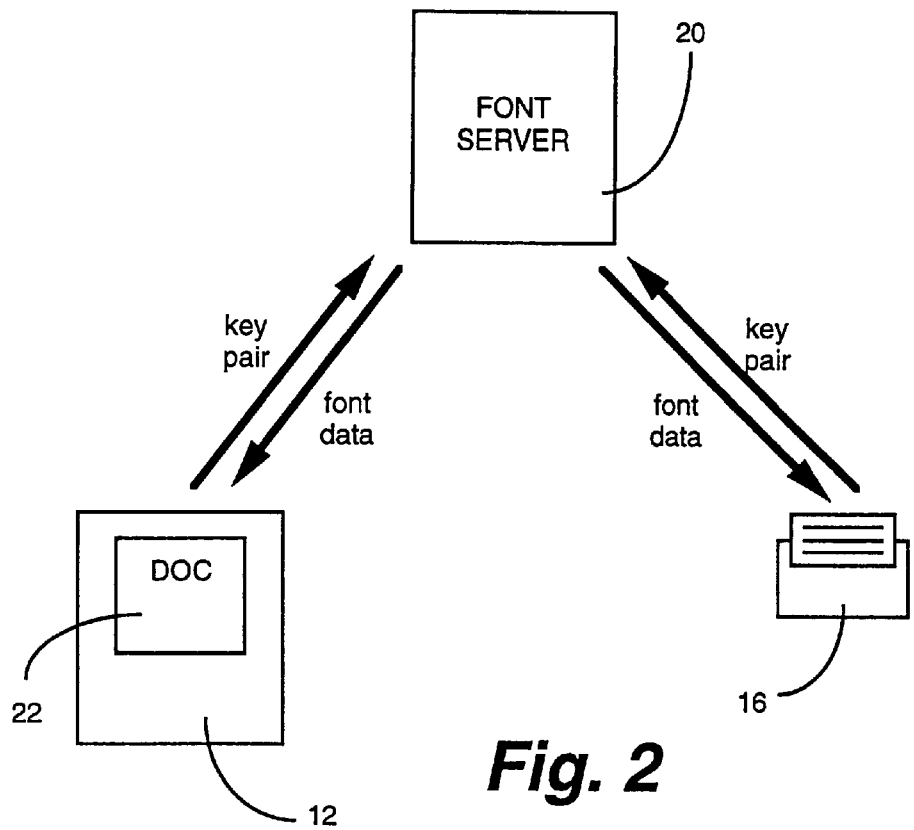
FIG. 2 is a functional block diagram illustrating operations that are carried out in accordance with the present invention.
Figure 3:
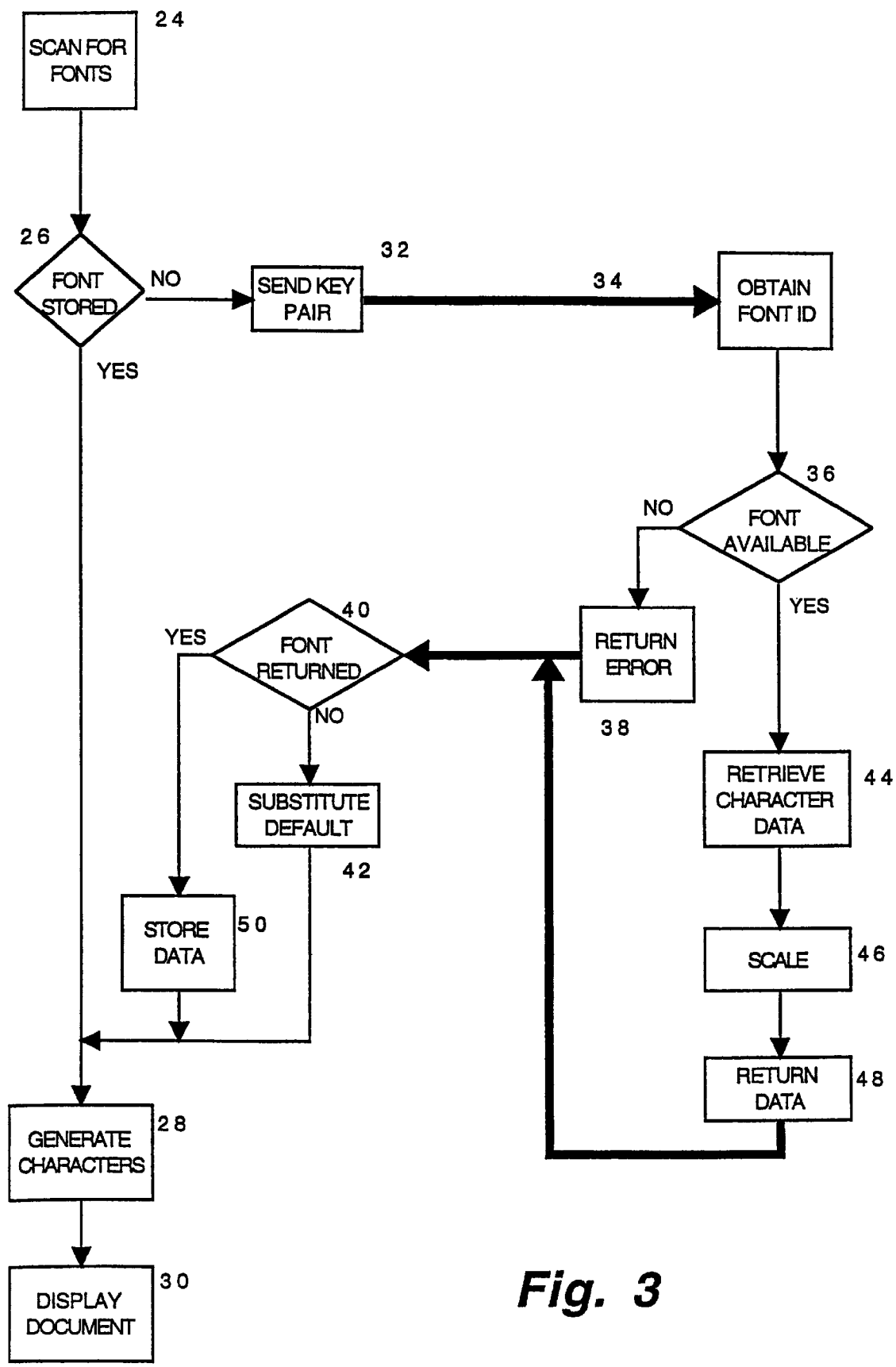
FIG. 3 is a flow chart of the operations that are carried out in accordance with the present invention.

Referring to FIGS. 2 and 3, a user at one of the computer nodes 12 on the network has received a document 22 that he desires to view and/or print at that node. For example, the document 22 may have been downloaded from a site on the internet. Upon generation of a command to display the document, it is first examined to identify each font contained in the document (Step 24). The particular manner in which this examination is carried out is determined by the host system, e.g. application program, which is accessing the document. For example, a word processing program may look for particular font codes in the document. For each identified font, a determination is made whether the resources necessary to generate that font, e.g. bitmap or outline glyph data, are stored at the computer (Step 26). If the necessary resources are available for all of the identified fonts, the characters are generated and displayed in the normal manner at Steps 28 and 30. If, however, the data for one or more identified fonts is not stored at the node, a request is transmitted to the font server 20 for the necessary resources (Step 32).

The request that is transmitted from the computer at the node 12 to the font server 20 comprises a pair of key terms, consisting of a font identification and a character identification, as shown in FIG. 4A. The font identification is determined as a result of the examination of the document, and identifies a particular font to be employed. The identification of the font can be in the form of an integer value, or can be a character string such as the name of the font, e.g. "Kanji Roman". The second element of the key pair, namely the character identification, specifies a particular character within the font of interest. The identification of the character can be in the form of a 7-bit ASCII code. Preferably, however, the character identification is implemented in a more universally employed unicode, which can comprise 16 bits or more.

The key pair is transmitted from the network node 12 to the font server 20, as indicated by the heavy line 34 in FIG. 3. In response thereto, the font server determines whether it contains data relating to the font that is identified in the key pair. If so, the server retrieves the data that pertains to the specific character identified in the key pair, and returns this data to the requesting node.

In the preceding example, the font data for a single character is requested and returned to the network node 12. However, each key pair request need not be limited to a single character. Rather, the font identification can be followed by multiple character identifications, as illustrated in FIG. 4B. For example, after a document has been examined to identify each font contained therein, the computer at the node 12 can generate a list of each character in the document which is associated with that font. If the font is not locally stored at the computer node 12, the request to the font server can comprise the identification of the font, followed by the identification of each character in that font which was detected during the examination.

In addition to the key pair, the request that is sent to the font server preferably also includes character attributes.

Referring to FIG. 4C, one such attribute is a format tag which specifies whether the requesting node desires the character data in a bitmap format, an outline format, or some other format. The specific format may be determined by the application program that is being used to display the document. Another attribute that can be provided along with the key pair is a scale function for the character(s). In this regard, rather than being merely an integer value, the scale function can be transmitted in the form of a transformation matrix. One example of a known 3×3 transformation matrix, which can be employed for two-dimensional characters, is shown below.

$$\begin{bmatrix} a & b & p' \\ c & d & p'' \\ t_x & t_y & 1 \end{bmatrix}$$

In this transformation matrix, the parameters a and d represent horizontal and vertical scaling terms, the parameters b and c are rotation terms, and $t_x$ and $t_y$ are translation terms. The parameters p' and p'' can be used for arbitrary purposes, which may be application dependent. For instance, in one application these parameters might be used to specify character projection values. For three-dimensional characters, a suitable 4×4 transformation matrix can be employed to specify the complete scaling function. Based upon the values in such a transformation matrix, the font server performs the calculations to transform the outline version of a character to achieve the required scaling function, and returns the transformed data to the requesting node. If the node had requested the data in a bitmap format, the font server can convert the transformed outline data into a bitmap representation of the character before returning it to the requesting node.

Referring again to FIG. 3, when the font server 20 receives a request from a node for font data, it first makes a determination whether the font data is stored at the server (Step 36). In the event that the server does not have the requested resource, it returns an error condition to the requesting node (Step 38). At the node, a determination is made whether the server has returned font data, or an error message (Step 40). If an error message is returned, the node carries out a predefined default action. For example, some users may prefer to substitute a different font, as depicted at Step 42, whereas others may desire to leave the spaces blank for the characters of the missing font or substitute a default character. Once the user has initially specified the default action, it is thereafter carried out in a transparent manner whenever a requested font is not available from the server 20, and the appropriate substitute characters (or blank spaces) are generated at Step 28.

If, on the other hand, the font server 20 contains the requested font data, that data is retrieved (Step 44), and the appropriate scaling is carried out in accordance with the transformation matrix (Step 46). The transformed character data is then returned to the requesting node (Step 48). When the data is received, the node stores the data (Step 50), which is then used to generate the characters and display the document at that site.

Although the foregoing explanation has been presented in the context of displaying a document, the same procedure is carried out when a document is sent to a printer to be printed, as schematically depicted in FIG. 2. For example, when a user at one of the computer nodes 12 sends a document to the network printer 16, the printer follows the same procedure and requests any necessary font resources from the font server 20 that are not locally stored.

In one implementation of the invention, the font server might be employed on a private network, for example within a single company or enterprise. In this type of situation, the font resources available on the server can be made freely available to all users having authorized access to the network. In another implementation, the font server might be accessible from a public network, such as the internet. In this situation, it may be appropriate to charge users a fee for the resources that are obtained from the server. In this case, users may be required to establish a subscription, or other unique form of identification, before access to the server is permitted. The server can be provided with an accounting module 52, which records the resources that are downloaded by each authorized user, so that an appropriate fee can be charged to the user.

From the foregoing, it can be seen that the present invention provides a mechanism via which users can display and print documents containing any of a large variety of fonts, without requiring font resource data to be included in a file with the document. In addition to the savings that are achieved in transmission time and memory requirements as a result of smaller document files, the invention offers the further advantage of platform independence. For example, a document created on one type of computer system can be transmitted to a different type of computer system at a remote site. At that remote site, the fonts which are appropriate to that computer system can be readily downloaded from the font server, so that the user can view and print the document at that site. Further in this regard, fonts can be displayed which are associated with languages other than those for which a particular computer is configured. For example, a document containing Japanese or Chinese characters can be transmitted to a computer which is configured for Roman languages, and still be reliably displayed and printed, using the original characters, due to the resources available from the font server.

It will be appreciated by those of ordinary skill in the art that the present invention can be embodied in other specific forms without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed:

1. A system for the distribution of documents, comprising:
 a data communication network containing a plurality of nodes at which documents can be created, viewed and/or printed and between which documents can be transmitted;
 a font server connected to said network and storing information pertaining to a plurality of different fonts having respective sets of characters that can be employed in documents;
 means at each of said nodes for determining whether information is locally stored at the node that describes a font whose characters are contained in a document;
 means at each of said nodes for requesting information that describes a given font from said font server if said given font is determined not to be locally stored at the node, wherein a request for information that is sent from a node to said font server comprises a key pair that includes an identification of a font and an identification of at least one character in the font, and a transformation matrix comprising one or more horizontal and scaling terms, one or more rotation terms and one or more translation terms; and means at said font server for determining whether requested information for a given font is stored at said font server and, if so, for reading said information, transforming the retrieved font information in accordance with said transformation matrix, and transmitting the information to a requesting node via said network, wherein each node is responsive to an error condition from the font server for executing a predefined default action in connection with the display and/or printing of characters of the given font, and wherein said predefined default action comprises substituting a default character or font for said requested information for a given font.

2. The system of claim 1 wherein said font server returns an error condition to a requesting node in the event that requested information for a given font is not stored at said font server.

3. The system of claim 1 wherein said information request further includes a designation of a particular format in which character data for an identified character is to be transmitted.

4. The system of claim 1 wherein said font server includes an accounting module which records nodes to which font information has been transmitted, and assesses a fee for such transmissions.

5. The system of claim 1, wherein said transformation matrix further comprises one or more application-specific terms which are used for arbitrary purposes.

6. The system of claim 5, wherein said transformation matrix further comprises one or more application-specific terms which are used for arbitrary purposes.

7. A system for the distribution of documents, comprising:

a data communication network containing a plurality of nodes at which documents can be created, viewed and/or printed and between which documents can be transmitted;

a font server connected to said network and storing information pertaining to a plurality of different fonts having respective sets of characters that can be employed in documents;

means at each of said nodes for determining whether information is locally stored at the node that describes a font whose characters are contained in a document;

means at each of said nodes for requesting information that describes a given font from said font server if said given font is determined not to be locally stored at the node; and means at said font server for determining whether requested information for a given font is stored at said font server and, if so, for reading said information and transmitting the information to a requesting node via said network, wherein said font server includes an accounting module which records nodes to which font information has been transmitted, and assesses a fee for such transmissions.

8. A method for presenting images of documents which contain text in any arbitrary font, comprising the steps of:

storing information pertaining to a plurality of different fonts, having respective sets of characters that can be employed in documents, in a font server that is accessible from remote sites;

determining at a remote site whether information is locally stored at the site that describes a font whose characters are contained in a document;

requesting information that describes a given font from said font server if said given font is determined not to be locally stored at the remote site; and determining at said font server whether requested information for a given font is stored at said font server and, if so, reading said information and transmitting the information to a requesting remote site; and recording, at the font server, the identification of a remote site to which font data is transmitted, and a fee to be assessed for the transmitted data.

* * * * *